US009801397B2

(12) United States Patent
Clarke et al.

(10) Patent No.: US 9,801,397 B2
(45) Date of Patent: Oct. 31, 2017

(54) COMESTIBLE PRODUCTS, APPARATUS FOR COMESTIBLE PRODUCTION

(75) Inventors: Peter Clarke, Crowthorne (GB); Sarah Marshall, Newbury (GB); Clive R T Norton, Bedminster, NJ (US)

(73) Assignee: CADBURY UK LIMITED, Birmingham West Midlands (GB)

(*) Notice: Subject to any disclaimer, the term of this patent is extended or adjusted under 35 U.S.C. 154(b) by 80 days.

(21) Appl. No.: 13/980,732

(22) PCT Filed: Jan. 19, 2012

(86) PCT No.: PCT/GB2012/050112
§ 371 (c)(1),
(2), (4) Date: Oct. 11, 2013

(87) PCT Pub. No.: WO2012/098401
PCT Pub. Date: Jul. 26, 2012

(65) Prior Publication Data
US 2014/0030386 A1    Jan. 30, 2014

Related U.S. Application Data

(60) Provisional application No. 61/434,465, filed on Jan. 20, 2011.

(30) Foreign Application Priority Data

Jan. 20, 2011    (GB) .................................. 1100976.8

(51) Int. Cl.
*B29C 47/06* (2006.01)
*A23G 3/34* (2006.01)
(Continued)

(52) U.S. Cl.
CPC ......... *A23G 3/0068* (2013.01); *A23G 3/2015* (2013.01); *A23G 3/54* (2013.01);
(Continued)

(58) Field of Classification Search
CPC ........ A23G 3/068; A23G 3/2015; A23G 3/34; A23G 3/54; B29C 47/06; B29C 47/061;
(Continued)

(56) References Cited

U.S. PATENT DOCUMENTS 3,377,964 A * 4/1968 Bell ...................... A23G 9/282
141/105
3,752,617 A * 8/1973 Burlis et al. ................ 425/131.1
(Continued)

FOREIGN PATENT DOCUMENTS

CN    1853405    10/2006
WO    2005056272    6/2005
(Continued)

OTHER PUBLICATIONS

IPRP and Written Opinion_PCT/GB2012/050112 dated Aug. 1, 2013.
(Continued)

*Primary Examiner* — Yogendra Gupta
*Assistant Examiner* — Joseph Leyson
(74) *Attorney, Agent, or Firm* — Cantor Colburn LLP (57) ABSTRACT

The apparatus (100) includes a die head (118) for extruding a main comestible material to form an extrudate body. A plurality of nozzles (160, FIG. 7) is located within the die head for introducing a comestible fluid into the extrudate body to form a plurality of filled capillaries. A control system (182) is capable of selectively connecting at least one of the nozzles to any one of at least two different fluid filling sources (150A, 15 OB). The control system may be capable of connecting each of the nozzles independently to different fluid sources or the nozzles may be arranged into two or more groups of flu idly interconnected nozzles that can each be independently switched between different fluid sources. The apparatus can be used to form products in which the
(Continued)

fillings in the capillaries are varied or in which an image is formed in cross section. The apparatus can also be used to switch production between products having different fillings without stopping extrusion.

17 Claims, 6 Drawing Sheets

(51) Int. Cl.
*B29C 47/10* (2006.01)
*A23G 3/20* (2006.01)
*A23G 3/54* (2006.01)
*B29C 47/92* (2006.01)

(52) U.S. Cl.
CPC ............ *B29C 47/06* (2013.01); *B29C 47/061* (2013.01); *B29C 47/1081* (2013.01); *B29C 47/92* (2013.01); *B29C 2947/92828* (2013.01)

(58) Field of Classification Search
CPC . B29C 47/062; B29C 47/065; B29C 47/1081; B29C 47/92; B29C 2947/92828
See application file for complete search history.

(56) References Cited

U.S. PATENT DOCUMENTS

| | | | | |
|---|---|---|---|---|
| 3,840,311 | A | * | 10/1974 | Wight ..................... 425/131.1 |
| 4,659,580 | A | * | 4/1987 | Svengren ..................... 426/516 |
| 6,887,503 | B1 | | 5/2005 | Rasmussen |
| 7,648,658 | B2 | * | 1/2010 | Harris ..................... 264/40.7 |
| 2007/0106420 | A1 | * | 5/2007 | Wyrwoll ............... B29C 45/76 700/200 |

FOREIGN PATENT DOCUMENTS

| WO | 2008044122 A2 | 4/2008 |
|---|---|---|
| WO | 2010034973 A1 | 1/2010 |
| WO | 2010034979 | 4/2010 |
| WO | 2010034981 A1 | 4/2010 |
| WO | 2011104564 A1 | 9/2011 |
| WO | 2011117638 | 9/2011 |

OTHER PUBLICATIONS

CN OA Application No. 201280006014.3 dated Feb. 27, 2014.
ISR PCTGB2012050112 dated May 24, 2012.
Great Britain Application No. 1003288.6; Date of Filing: Feb. 26, 2010; 82 Pages.

* cited by examiner

COMESTIBLE PRODUCTS, APPARATUS FOR COMESTIBLE PRODUCTION

CROSS REFERENCE TO RELATED APPLICATIONS

This is a U.S. national stage of application no. PCT/GB2012/050112, filed on Jan. 19, 2012, which claims priority to U.S. Provisional Application No. 61/434,465 filed Jan. 20, 2011 and GB Application No. 1100976.8 the disclosures of which are incorporated herein by reference.

FIELD

The disclosure relates to comestible products and to apparatus and methods for producing comestible products by means of extrusion. This disclosure is particularly, though not exclusively, related to comestible products comprising a plurality of capillaries.

BACKGROUND

WO 2010/034973 A1 and WO 2010/034981 A1, both in the name of the applicant, describe confectionery products comprising a plurality of capillaries together with apparatus and methods for their production. The present disclosure is a further development of this concept and the reader should refer to WO 2010/034973 A1 and WO 2010/034981 A1, the contents of which are hereby incorporated by reference in their entirety.

Briefly, WO 2010/034973 A1 and WO 2010/034981 A1 describe confectionery products comprising an extruded body portion which has a plurality of capillaries disposed therein. The capillaries have an average width or diameter of no more than 3 mm but could have an average width or diameter as small as 10 um. The extruded body is formed from a comestible, confectionery material which is liquid during extrusion but which subsequently sets or solidifies. The capillaries are filled with a fluid that may be air or a liquid confectionery material. In some cases, the liquid filling material also sets or solidifies after extrusion. Several examples are described and include products in which the body portions are formed from extruded hard candy, chewing gum, or chocolate. In the examples, a variety of filling materials for the capillaries are used, including: air, liquid fondant, liquid cocoa butter, Monopropylene glycol, Golden Syrup, and chocolate. However, the present disclosure is not limited to the materials used in the examples. Embodiments are also disclosed in which the product comprises first and second extruded portions, both having a plurality of capillaries disposed therein, and wherein the capillaries in each portion are: a) discontinuous; and/or b) continuous and orientated in more than one direction.

WO 2010/034973 A1 and WO 2010/034981 A1 disclose methods and apparatus for producing the products. FIGS. 1 to 5 of the accompanying drawings show somewhat schematically the apparatus used to produce some of the examples in WO 2010/034973 A1 and WO 2010/034981 A1. The apparatus briefly comprises an electric motor 12 which is drivingly coupled to the single screw extruder. The extruder has a barrel 28 surrounding the screw 14 which has three independently controllable temperature zones denoted T1 to T3. The barrel 28 is connected to an extrusion die 18 by means of a feed conduit 29 which also has an independently controllable temperature zone T4. The extruder 14 is fed at one end from a hopper 16 and the molten material is extruded through an outlet aperture 20 in the die 18. Quench jets 22 are directed towards the die outlet aperture 20 so as to cool the extruded material 23 and these jets are fed with compressed air 24. If desired, the area of the apparatus where the hopper 16 is coupled to the screw 14 can be cooled by means of a cooling feed 26. In use, the hopper 16, which may be heated, is filled with a confectionery material 30 (such as candy broken into pieces) for forming the body of the product Before the material passes into the screw 14 it can be cooled by means of the cool feed 26 so as to ensure that the material is at the correct temperature for entering the screw extruder. As the screw is rotated, the material is drawn along the screw 14 inside the barrel 28 and the temperature of the zones T1-T3 adjusted so that the material is delivered in a molten/liquid state to the feed conduit 29. The liquefied material passes through the feed conduit 29 and its temperature adjusted again (if required) by temperature control T4 before entering the die head 18.

The die head 18 (shown in FIGS. 3 to 5) includes an outer body 70 having an opening 74 connected by means of an inner passage or flow path to the outlet aperture 20. Molten material 72 for forming the body of the product enters the opening 74 from the feed conduit and passes along the flow path to exit the die through the aperture 20, the shape of which defines the outer cross sectional profile of the extrudate 23. A nozzle assembly 58 (shown on its own in FIG. 3) having a number of needles or inlet nozzles 60 is located within the flow path in the outer body so that the liquid material passes over and around the nozzles. The nozzles 60 are similar to hypodermic needles being hollow and having an outlet at their distal, downstream end. The nozzles 60 are all in fluid communication with an inlet channel 64 via a cavity in the body 62 of the nozzle assembly. The inlet channel 64 is fluidly connected with a fluid source by means of a fluid feed conduit 56 to form fluid filled capillaries within the extrudate body. In the embodiment shown in FIG. 1, the inlet channel is connected with a source of air at ambient pressure and temperature so that the capillaries are air filled.

Figure 5:
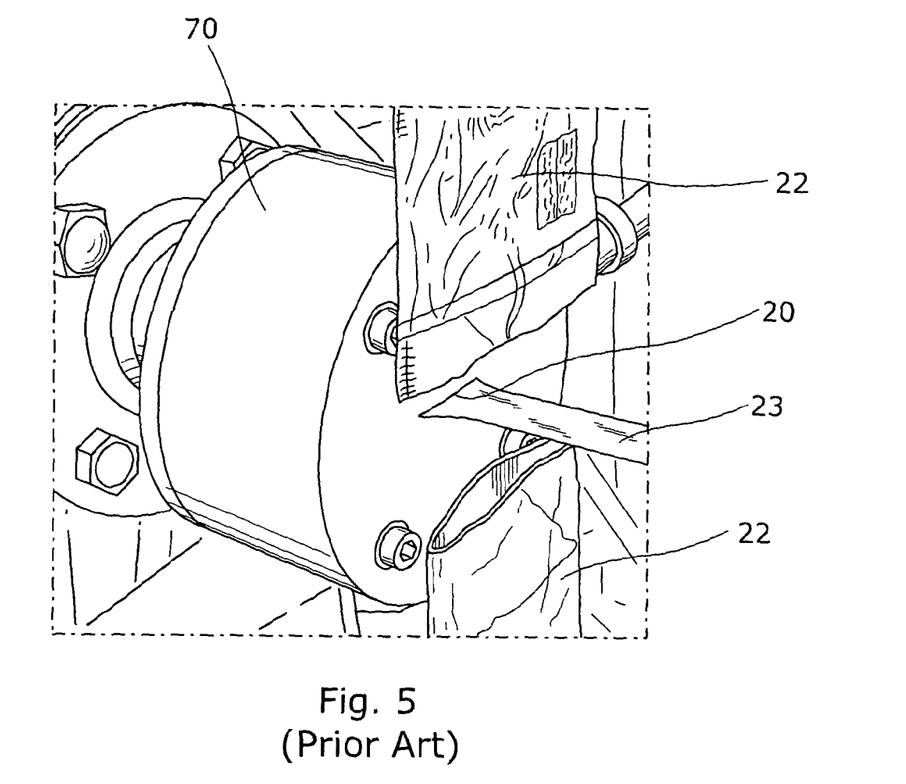
FIG. 5 is a perspective view of the extrusion die head of FIG. 4, showing air jets used to cool the extrudate when leaving the die.

As shown in FIG. 5, the extrudate 23 is cooled by means of the quench jets 22 as it is released from the die 18. A valve 32 controls the flow of compressed air to the quench jets 22 and pressure devices P1 and P2 control the pressure of the compressed air 24 before and after the valve. The compressed air line also has a temperature control T6 so as to control the temperature of the air. The quench jets were used in particular for the generation of high-voidage material but are not essential.

Figure 1:
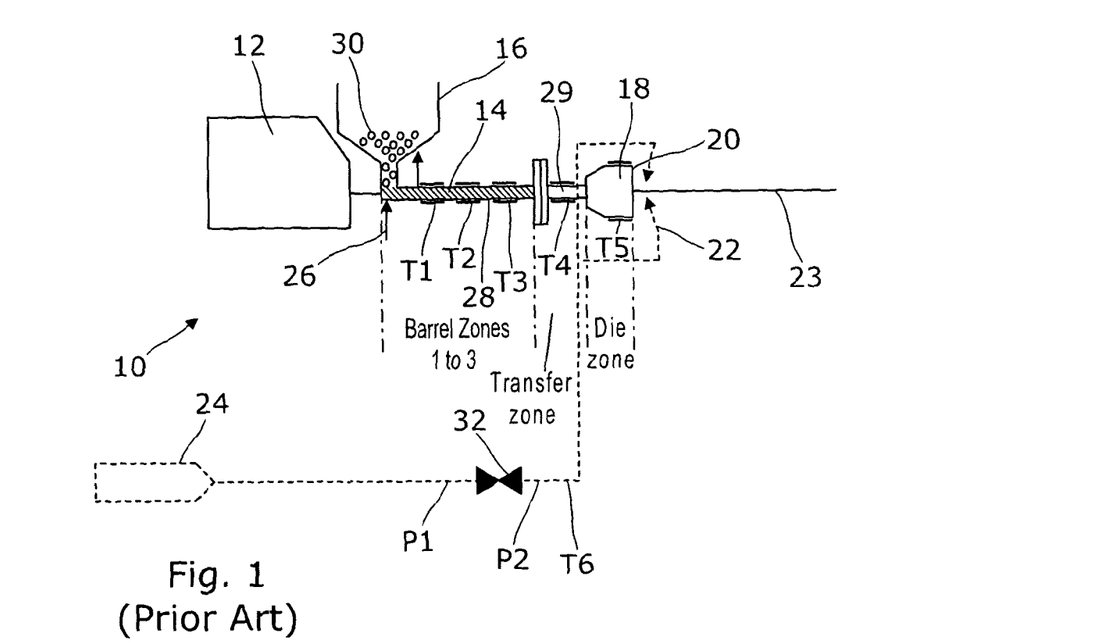
FIG. 1 is a schematic diagram illustrating the known apparatus used to produce Examples 1 and 2 in the experiments described in WO 2010/034973 A1.
Figure 2:
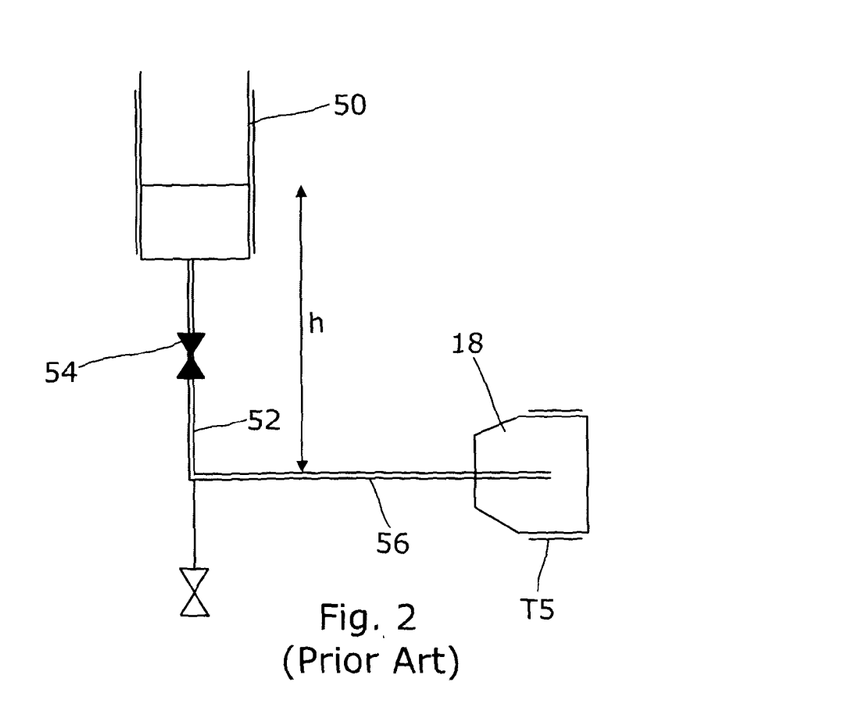
FIG. 2 is a schematic diagram illustrating known apparatus used in conjunction with the apparatus shown in FIG. 1 to provide liquid filled capillaries as described and shown in WO 2010/034973 A1.
Figure 3:
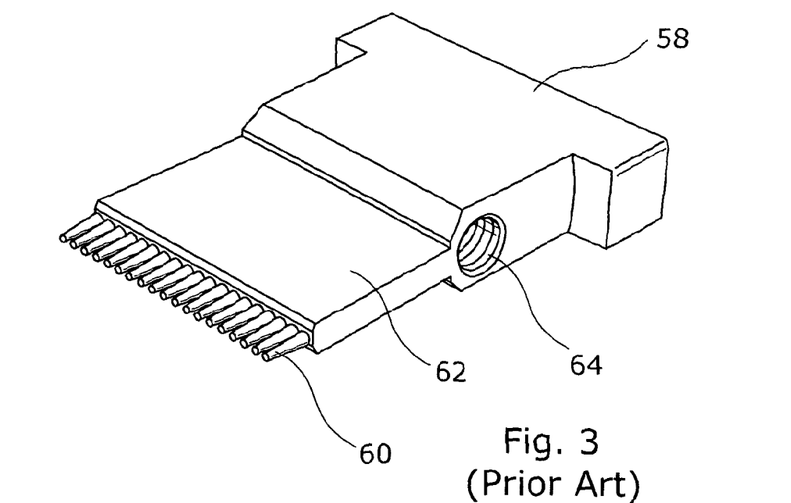
FIG. 3 is a perspective view of a nozzle assembly forming part of a die head in the known apparatus illustrated in FIGS. 1 and 2.
Figure 4:
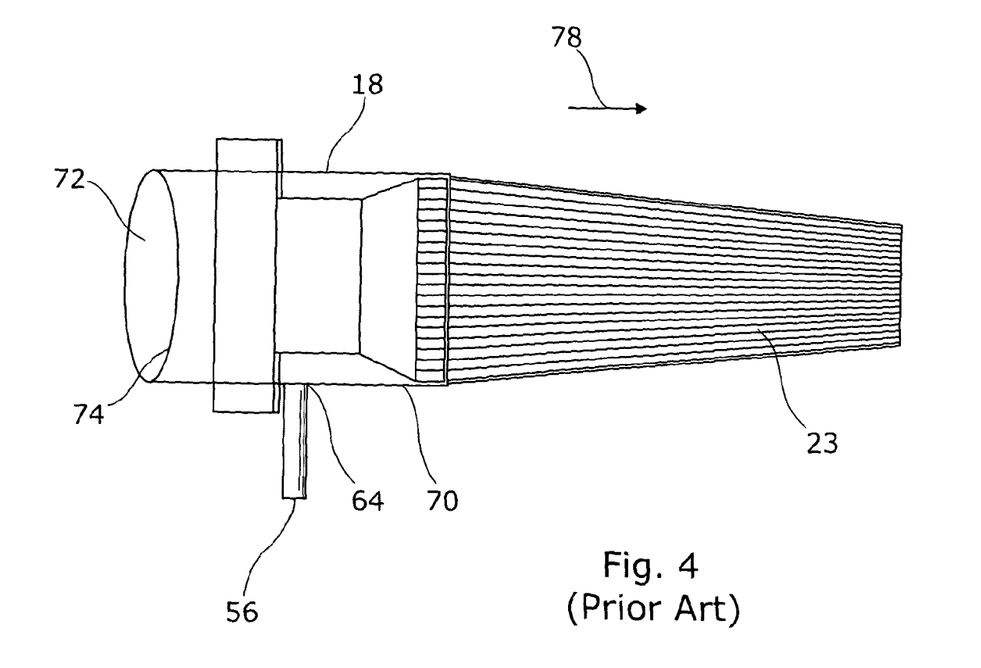
FIG. 4 is a plan view of an extrusion die head which incorporates the nozzle assembly shown in FIG. 3 and which forms part of the known apparatus as illustrated in FIGS. 1 and 2.

FIG. 2 illustrates schematically an adaptation of the apparatus shown in FIG. 1 to introduce a liquid confectionery filling material into the capillaries rather than air. In this arrangement, the nozzles 60 are fluidly connected to a reservoir 50 containing a liquid filling material with a hydraulic head of pressure h. In one embodiment, the liquid filling material is cocoa butter and the reservoir 50 is heated so that the cocoa butter is maintained at the correct temperature so as to maintain it in a liquid state. The reservoir 50 is connected to a conduit 52 having an isolation valve 54 for controlling the flow of liquid. The conduit 52 is encased in a trace heating tube 56 which maintains the temperature of the conduit so that the liquid remains in a liquid state during its movement within the conduit. The conduit 52 is coupled to the inlet channel 64 of the nozzle assembly 58 which is in fluid connection with the nozzles 60 so that so that the liquid cocoa butter is fed through the nozzles as the main material is being extruded to simultaneously fill the capillaries formed around the nozzles with cocoa butter.

WO2005/056272 A1 discloses an apparatus for producing an extruded product including a plurality of capillary channels. WO2008/044122 A1 discloses a related apparatus, which additionally includes means for quench cooling an extrudate as it exits the die. The apparatus described in either of these documents may also be employed/adapted for use in producing a comestible product having a body with a plurality of capillaries. The contents of WO2005/056272 A1 and WO2008/044122 A1 are also hereby incorporated by reference in their entirety.

SUMMARY

The present disclosure provides apparatus and methods for producing a comestible product comprising a plurality of capillaries that are more versatile than the known apparatus and methods.

The present disclosure provides apparatus and methods for producing a comestible product comprising a plurality of capillaries that enable a broader range of comestible products to be produced than the known apparatus and methods.

The present disclosure provides apparatus and methods for producing a comestible product comprising a plurality of capillaries that enable a customized comestible product to be produced in response to an input from a consumer.

The present disclosure provides apparatus and methods for producing a comestible product comprising a plurality of capillaries that enable a comestible product to be produced containing an image and/or text.

The present disclosure provides a comestible product comprising a plurality of capillaries, which contains an image and/or pattern.

The present disclosure provides a comestible product comprising a plurality of capillaries and in which in at least one of the capillaries has portions spaced along its length which are filled with different fluids.

In accordance with a first aspect of the disclosure, there is provided apparatus for producing a comestible product, the apparatus comprising a die head defining flow path leading to a die aperture for extruding a main comestible material to form an extruded body, a plurality of nozzles within the flow path for introducing a comestible fluid into the extruded body to form a plurality of filled capillaries in the extruded body, and a control system for selectively connecting at least one of the nozzles to any one of at least two fluid sources or for selectively connecting at least two different nozzles to at least one source of fluid materials.

The apparatus may be configured such that the control system is able, in use, to independently connect each nozzle, or at least one of two or more groups the nozzles, with any one of at least two different sources of comestible fluid. At least some of the nozzles may be fluidly interconnected to form a group and the control system may be operative to selectively connect the, or at least one, group of fluidly interconnected nozzles to any one of at least two fluid sources. Alternatively, the control system may be operative to selectively connect all the nozzles collectively to any one of at least two fluid sources.

The control system may comprise an electronic control unit. The control system may comprise a valve arrangement operative under the control of the electronic control unit to selectively connect the at least one of the nozzles to any one of the at least two fluid sources. Where the control system is operative to selectively connect each of the nozzles independently to any one of at least two fluid sources, each nozzle may be independently fluidly connected with a valve for selectively connecting the nozzle with any one of at least two fluid sources, each valve being independently controlled by electronic control unit.

The nozzles may be arranged in a matrix.

Each of the nozzles may have a external width or diameter of 3 mm or less.

The control system may comprise a CPU which may be part of a computer network. The computer network may be a wide area network, such as the internet.

The apparatus may have a delivery system for delivering a main comestible material to the die head in a molten or liquid state for extrusion through the die aperture to form the extruded body. The delivery system may comprise an extruder.

At least one of the fluid sources may comprise a source of a liquid comestible material. At least one of the fluid sources may be a source of a gaseous comestible material such as air.

The control system may be configured so as to be capable of selectively changing the fluid source to which the at least one nozzle is connected whilst the main comestible material is being extruded through the die aperture.

In accordance with a second aspect of the disclosure, there is provided a process for manufacturing comestible products having an extruded body portion formed from a comestible material, the body having a plurality of filled capillaries disposed therein using the apparatus in accordance with the first aspect of the disclosure, the process comprising: carrying out a first production run to produce a first product, during which first production run a main comestible product is extruded through the die to produce an extrudate body and the control system is operative to connect the nozzles to fluid source(s) as appropriate for the first product; subsequently carrying out a second production run to produce a second product, during which second production run a main comestible product is extruded through the die to produce an extrudate body and the control system is operative to connect the nozzles to fluid source(s) as appropriate for the second product, wherein between production runs, different fluid source(s) are connected to the same or different nozzles and/or the same fluid source(s) are connected to different nozzles.

The process may comprise extruding the same main comestible material through the die head to produce the extruded body in both of the first and second production runs.

Production may be switched from the first production run to the second production run without stopping extrusion of the main comestible product.

In accordance with a third aspect of the disclosure, there is provided a process for manufacturing comestible products having an extruded body portion formed from a comestible material, the body having a plurality of capillaries filled with a fluid disposed therein using the apparatus in accordance with the first aspect of the disclosure in which each nozzle is independently connectable to any one of at least two fluid sources, the process comprising extruding a main comestible product through the die to produce an extrudate body and using the control system to simultaneously connect selected nozzles to at least one fluid source and the remaining nozzles to at least one other fluid source so that the fluid filled capillaries in the extrudate body define an image or pattern visible in lateral cross section of the extrudate body.

The image or pattern defined by the filled capillaries may be selected from the group consisting of: text, numbers, logos, pictures, and graphical representations.

The process may comprise using the control system to change the fluid source(s) to which at least some of the nozzles are fluidly connected whist the main comestible material is being extruded so that within each product length of extrudate, there are portions in which the fluid filled capillaries define different images or patterns.

The process may comprise connecting the selected nozzles with one of a source of air and a source of the main comestible material used to form the extrudate body and connecting the remaining nozzles the other of a source of air and a source of the main comestible material used to form the extrudate body.

The process may comprise connecting the selected nozzles with one of a source of air and a source of a comestible liquid filling material and connecting the remaining nozzles with the other of a source of air and a source of a comestible liquid filling material.

The process may comprise connecting the selected nozzles with a source of at least one comestible liquid filling material and connecting the remaining nozzles with a source of at least one other comestible liquid filling material having a contrasting appearance. In which case, one of the comestible liquid filling materials may be the main comestible material used to form the extrudate body.

In accordance with a fourth aspect of the disclosure, there is provided a process for manufacturing comestible products having an extruded body portion formed from a comestible material, the body having a plurality of capillaries disposed therein using the apparatus in accordance with the first aspect of the disclosure, the process comprising extruding a main comestible product through the die to produce an extrudate body and using the control system to change the fluid source and or flow of fluid to which at least one of the nozzles is connected whilst the main comestible product is being extruded so that within each product length of the extrudate body, at least one of the capillaries is filled with a different fluid at different positions along its length and or formed at different positions at different portions along its length.

The process may comprise connecting said at least one nozzle to sources of fluid materials which have different flavours, colours and/or textures.

Where at least some of the nozzles are fluidly interconnected and the control system is operative to selectively connect the fluidly interconnected nozzles collectively to any one of at least two fluid sources, the process may comprise using the control system to change the fluid source to which the fluidly interconnected nozzles are connected whilst the main comestible product is being extruded so that each product length of the extrudate body has at least two portions in which the capillaries are filled with different fluid materials.

Where each of the nozzles are independently connectable to any one of at least two fluid sources, the process may comprise introducing one fluid material through some of the nozzles and introducing at least one other fluid material through the other nozzles simultaneously so that in at least one portion of each product length of the extrudate body, some of the capillaries are filed with said one fluid material and other of the capillaries are filled with said at least one other fluid material. The process may comprise varying the ratio of nozzles connected to each of said one fluid material and said at least one other fluid material over the course of extruding each product length of the extrudate body.

In accordance with a fifth aspect of the disclosure, there is provided a comestible product comprising an extruded body portion having a plurality of fluid filled capillaries having a width or diameter of 3 mm or less, in which the capillaries define an image or pattern visible in lateral cross section of the extrudate body.

The image defined by the fluid filled capillaries may be selected from the group consisting of: text, numbers, logos, pictures, graphical representations.

The capillaries may be filled with air. Alternatively, some of the capillaries may be filled with a first fluid material and other of the capillaries filled with at least one different fluid material.

In accordance with a sixth aspect of the disclosure, there is provided a comestible product comprising an extruded body portion having a plurality of fluid filled capillaries having a width or diameter of 3 mm or less, in which at least one of the capillaries is filled with different fluid materials at different positions along its length.

All the capillaries may be filled with different fluid materials at different positions along their length.

The different fluid materials may have differing flavours, colours and/or textures.

A comestible product in accordance with either of the fifth or sixths aspects of the disclosure may be a confectionery product.

In accordance with a seventh aspect of the disclosure, there is provided an apparatus for producing a comestible product, the apparatus comprising a die head defining flow path leading to a die aperture for extruding a main comestible material to form an extruded body, a plurality of nozzles within the flow path for introducing a comestible fluid into the extruded body to form a plurality of filled capillaries in the extruded body, and a control system for selectively and independently connecting each nozzle, or at least one of two or more groups the nozzles, with any one of at least two different sources of comestible fluid.

BRIEF DESCRIPTION OF THE FIGURES

Specific embodiments of the present disclosure will now be described, by way of example only, with reference to the accompanying drawings, in which.

DETAILED DESCRIPTION

The same reference numerals as those adopted in WO 2010/034973 A1 will be used in the following description to identify the same features or features which perform substantially the same function in the apparatus in accordance with the present disclosure, except that the numbers will be increased by one hundred in the first embodiment and by a further one hundred in each case for each successive embodiment.

Figure 6:
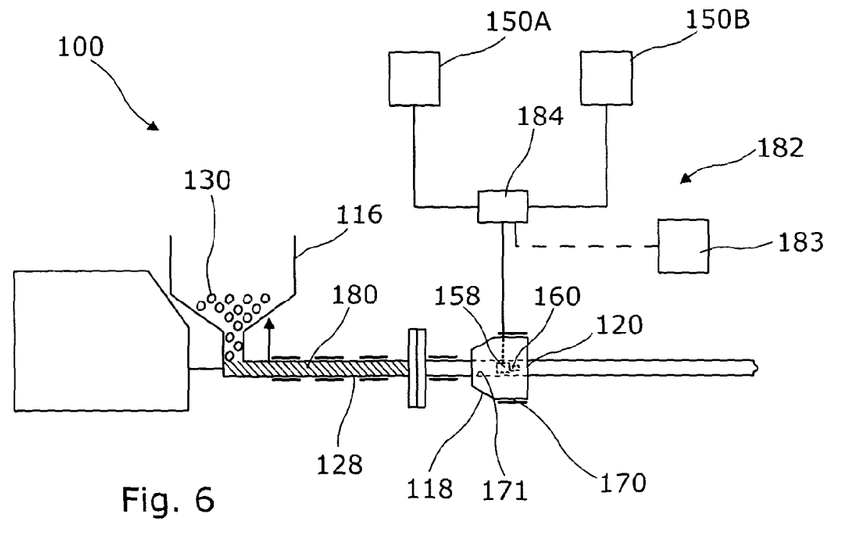
FIG. 6 is a schematic representation of an apparatus in accordance with a first embodiment of the present disclosure.

FIG. 6 illustrates schematically an apparatus 100 for extruding a comestible product comprising a plurality of capillaries in accordance with the disclosure.

The apparatus 100 is similar to the apparatus 10 as shown in FIGS. 1 to 5 and comprises an extruder 180 having a barrel 128 and a die head 118. The die head 118 comprises an outer body 170 defining a flow path 171 leading to a die aperture 120 through which a main comestible material is extruded to form an extrudate body 123. The shape of the aperture 120 defines the outer cross-sectional profile of the extrudate. The apparatus also includes a first material delivery system 116 which delivers the main comestible material 130 to the extruder in a suitable condition for extrusion. This could comprise a hopper feed arrangement, for example.

The precise nature of the extruder 180 and the first material delivery system 116 is not an essential element of the present disclosure. Those skilled in the art will appreciate that a number of different extruder arrangements can be adopted for use in the apparatus of the present disclosure depending on the material to be extruded, including apparatus such as that described in WO2005/056272 A1, WO2008/044122 A1, WO 2010/034973 A1, and WO 2010/034981 A1. In general, the main comestible material will be extruded through the die head in a liquid or molten state and the material delivery system and extruder should be configured accordingly. The extruder could be a screw extruder (either single or twin screw), a ram extruder, or a pump extruder for example. In some applications, it may be possible to directly pump a liquid material through the die head.

A nozzle assembly 158 having a plurality of hollow needles or outlet nozzles 160 is located within the die head 1 16 so that the main comestible material flows over and between the nozzles as its passes along the flow path and through the die aperture to produce an extrudate body comprising a plurality of capillaries corresponding substantially to the number, location and shape of the nozzles 160. Each of the nozzles 160 has an outlet at a distal, downstream end and is in fluid connection with a source of a fluid material so that a fluid can be introduced into the capillary formed in the extrudate body about each nozzle.

As so far described, the apparatus 100 is similar to the known apparatus 10 as shown in FIGS. 1 to 5. However, in accordance with one embodiment of the disclosure, in the apparatus 100 the nozzles 160 are each independently and selectively connectable to at least two different fluid sources 150A, 150B. The apparatus 100 also comprises a control system, indicated generally at 182, comprising an electronic control 183 and a valve block 184 which are operative to control which of the fluid sources each nozzle 160 is in fluid communication with.

Figure 7:
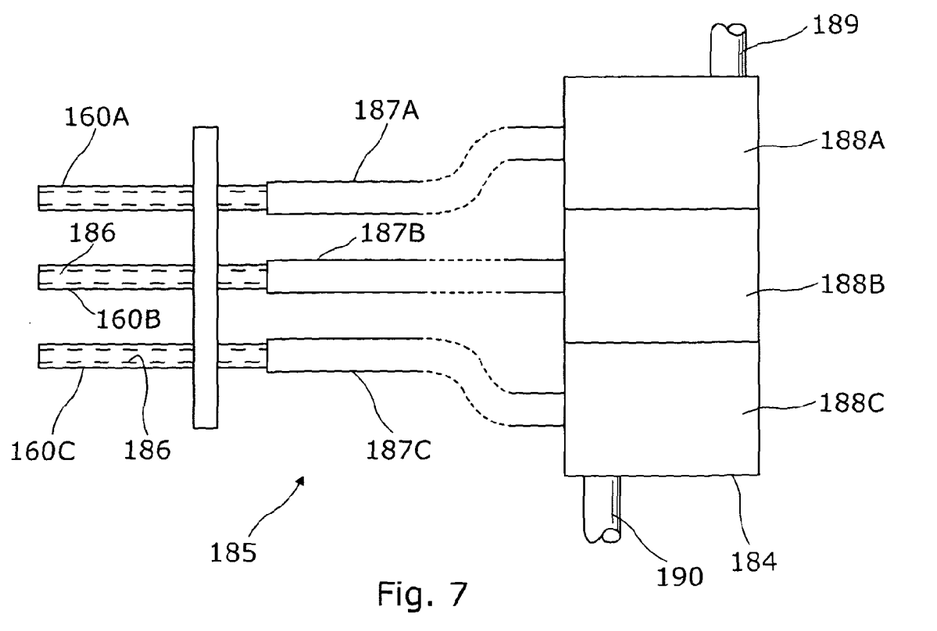
FIG. 7 is a schematic representation of a nozzle feed arrangement for use in apparatus in accordance with the disclosure.

One possible embodiment of a suitable nozzle feed system 185 is illustrated schematically in FIG. 7. Each nozzle 160 has an internal fluid passage 186 which is fluidly connected with the valve block 184 by means of a conduit 187. The valve block 184 contains valve means operable under control the electronic control 183 to selectively connect each of the conduits with any one of the at least two fluid sources 150A, 150B by means of conduits 189 and 190 respectively. FIG. 7 illustrates three outlet nozzles 160A, 160B, 160C each independently connected with a separate valve 188 A, 188B, 188C by a respective conduit 187A, 187B, 187C. Each of the valves 188A, 188B, 188C can be independently switched to connect its respective nozzle with either one of the two fluid sources 150A, 1S0B. The valves may be solenoid actuated valves operative in response to a control signal from the electronic control 183. It will be appreciated that three nozzles and valves are shown in FIG. 7 for illustrative purposes only and the number of nozzles and valves can be selected as desired for any particular application.

In the apparatus 100, each of the nozzles 160 is independently connectable to any one of the two or more fluid sources 1S0A, 150B at any one time. The control system 182 is operative to selectively change the fluid source to which any one nozzle 160 is connected as desired, even whilst extrusion is in progress. This significantly increases the versatility and adaptability of the apparatus 100 when compared with the prior art.

There are a variety of methods in which the apparatus 100 as described above can be used to produce comestible products.

Figure 8:
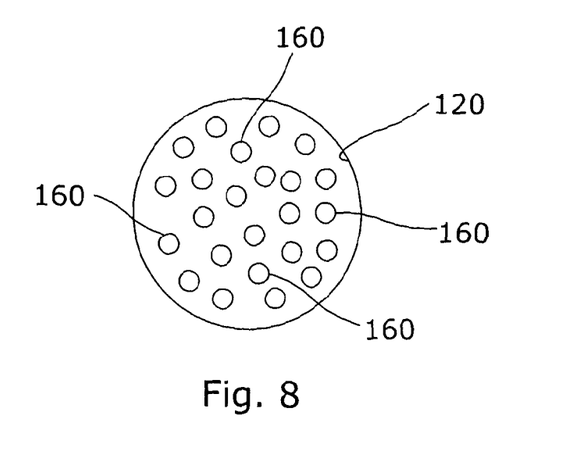
FIG. 8 is a front view of an extruder die head containing a matrix of inlet nozzles for use in the apparatus of FIG. 6.
Figure 9:
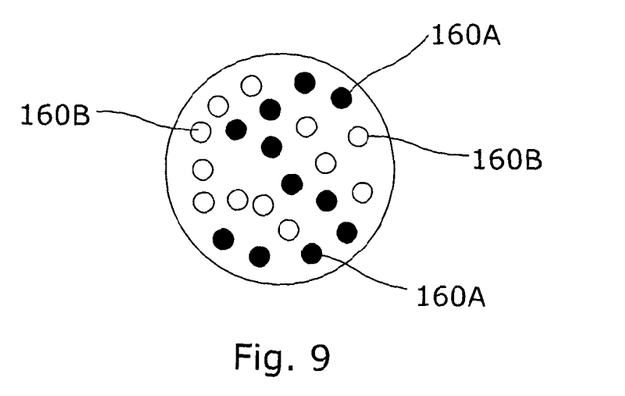
FIG. 9 is a view similar that of FIG. 8, illustrating how a fluid filling material can be introduced through certain of the nozzles only to create an image in a comestible product extruded through the die head.

In one method, an image is created in the extruded product by selectively delivering different fluids through different nozzles 160 at the same time. FIG. 8 illustrates a die head having a circular die outlet 120 with a number of outlet nozzles 160 dispersed within the area of the outlet 120. FIG. 9 illustrates how a letter "S" can be created by a selecting certain of the nozzles 160A. The letter "S" can be differentiated in the extruded product in a number of ways. In one approach, air or a contrasting liquid filling material is introduced through the selected nozzles 160A to produce capillaries filled with air or the liquid filling material and the unselected nozzles 160B are connected to a source of the main comestible material used to form the body of the extrudate so that, in effect, no capillaries are formed about the unselected nozzles. In this arrangement fluid filled capillaries are only formed about the selected nozzles 160 A to define the image in an otherwise solid extrudate body. In an alternative approach, air may be directed through the selected nozzles 160A and a liquid filling material introduced through the non-selected nozzles or visa versa, so that the image is defined either by the air filled capillaries or by the contrasting liquid material filled capillaries. In a further alternative, a first liquid filling material can be introduced through the selected nozzles 160A and a second contrasting liquid filling material introduced through the non-selected nozzles 160B to define the image. Those skilled in the art will appreciate that there are a number of different ways in which an image can be produced in the extrudate body by introducing a combination of different liquid filling materials and/or air through the selected and non-selected nozzles. Images created in this way are viewable in cross section of the product in the manner of a stick of rock. In some products, the capillaries are exposed at either end of the body so that the image can be seen. In other products, the ends of the extruded body are coated or capped so that the image is only seen when the product is broken in two laterally.

A variety of types of image can be created in this way depending on the overall cross-sectional shape of the extruded product and the number and size of the nozzles. These might include: text, numbers, trademarks, and simple pictures or graphical designs. For example, where the extruded product is a large block of chocolate, it would be possible to extrude the product to have a word, such as a person's name, running along its length.

It will be appreciated that the achievable image resolution is dependent on the number, size and proximity of the nozzles 160 used. Thus increased image resolution can be obtained by using more and smaller nozzles positioned closer together but this comes at the expense of a more complex nozzle and fluid feed arrangement. Particularly for use in producing an image in the extruded body, the nozzles 160 may be arranged in matrix in which the nozzles 160 are aligned in rows and columns or some other pattern.

Figure 10:
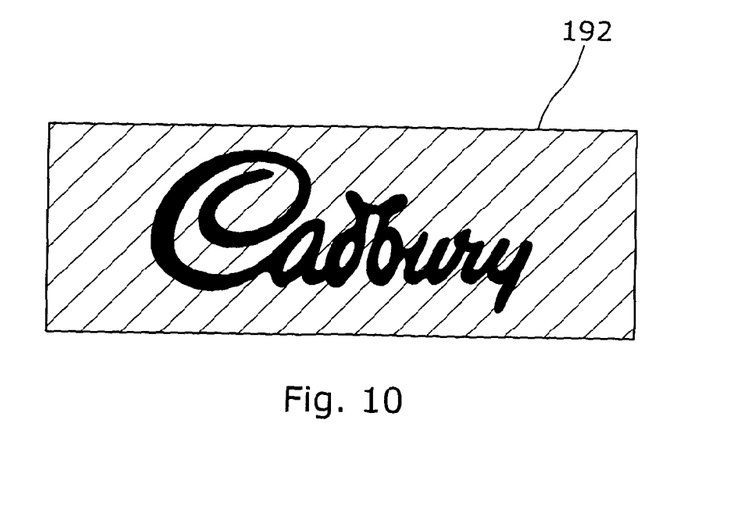
FIG. 10 is a lateral cross sectional view through a confectionery product in which an image in the form of a trade mark is defined by the fluid filled capillaries.

The apparatus 100 as described above can also be used to produce a product in which the extruded image changes along the length of the product. For example a chocolate bar might be extruded in which the words "Cadbury", "Dairy" and "Milk" ® appear sequentially along its length. To achieve this effect, the control system 182 is arranged to vary the materials introduced through at least some of the nozzles 160 during the extrusion of each product length of extrudate to produce the desired images in different portions along each product length. There may be portions of the body having no image between each different image. Alternatively, the images may change substantially instantaneously or there may be a gradual blurring from one image to the next. FIG. 10 illustrates schematically a lateral cross section through a chocolate bar in which the word "Cadbury"® is defined by the capillaries.

The term "product length" is used herein to refer to a length of extrudate which forms the basis of a separate extruded product. When material is extruded it generally forms a substantially continuous length of extrudate which is subsequently divided into separate lengths. The separated lengths may constitute finished products or they may be subject to further treatment such as folding, shaping or coating. In some cases, the extrudate is subject to further treatment such as stretching before it is divided. Accordingly, the portion of an extrudate which constitutes a product length at the die head need not be the same length as the finished product itself. More than one product may be packaged together for presentation to the consumer. For example, where the extruded product is a chocolate bar, each bar may be packaged separately or two or more bars may be packaged together. The term extruded product in this context refers to each extruded item regardless of whether it is packaged separately or together with one or more extruded items.

In an alternative method, the control system 182 is arranged to change the fluid supplied to at least some of the nozzles 160 during extrusion of each product length of extrudate, so that each product length contains portions having different flavours, colours and/or textures.

Figure 11:
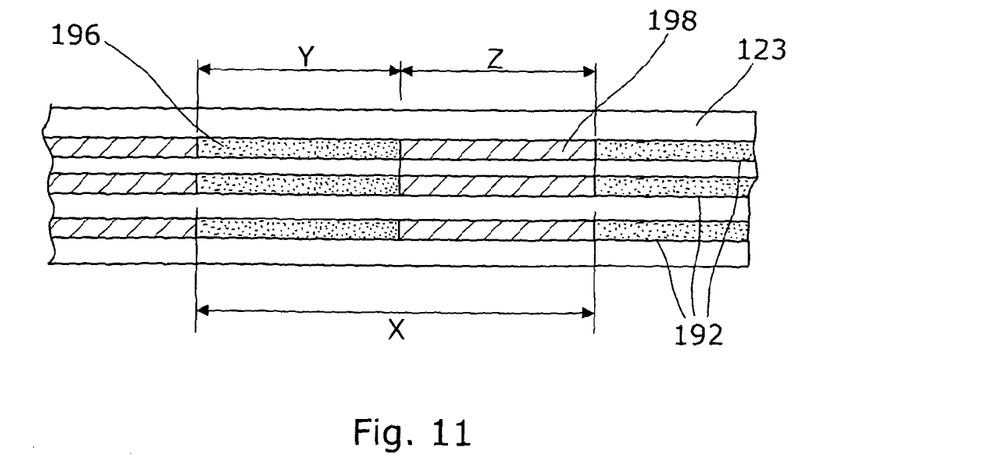
FIG. 11 is a longitudinal cross sectional view through part of an extrudate body formed using apparatus in accordance with the disclosure, illustrating how the capillaries can be filled with different fluid materials in different sections along each product length of the extrudate.

In a simple example, each nozzle 160 is connectable any one of two liquid filling material sources under the command of the control system 182. The control system 182 connects all the nozzles 160 to a first liquid filling material source to enable extrusion of a first portion of a product length of the extrudate body and subsequently connects the nozzles to the second liquid filling material source to enable extrusion of a second portion of the product length of the extrudate body. This cycle is repeated so that each product length of the extrudate body has a first portion in which the capillaries are filled with a first liquid filling material and a second portion in which the capillaries are filled with a second liquid filling material having a different flavour, colour and/or texture to the first. One of the liquid filling materials may be the same as the material used to form the body of the extrudate so that one of the portions in effect has no capillaries. FIG. 11 is a longitudinal cross section through a length of extrudate 123 illustrating how a single product length X of the extrudate may contain first and second portions Y, Z in which the capillaries 194 are filled with different filling materials 196, 198.

The portions need not be totally discreet as there may be a gradual change in the flavour, colour, and or texture along the length of the product. For example when extruding a product length, a first liquid filling material may be introduced through all the nozzles initially and the nozzles gradually switched to a source of a second liquid filling material having a different flavour until all the nozzles are delivering the second liquid filling material as extrusion of the product length draws to an end. This arrangement can be used to create a gradual change in flavour, colour, and/or texture over the product length.

Those skilled in the art will appreciate that the apparatus 100 can be used in many different ways to create different flavour and texture combinations. For example, air may be introduced through some of the nozzles and a liquid filling material introduced through the other nozzles at the same time so that the extrudate body has a combination of air filled and liquid filled capillaries to produce different taste/texture combinations. The ratio of air filled to liquid filled capillaries can be varied and can be changed over the course of each extruded product length to alter the taste texture. In addition or alternatively, two or more different liquid filling materials can be introduced through various nozzles at the same time to produce different taste, colour and texture combinations. The ratio of the different fillings can be varied and can be changed over the course of each extruded product length so that each product length has portions with different flavours, colours and/or textures. As with the previous example, air could be introduced simultaneously through some of the nozzles.

Whilst the ability to connect each nozzle 160 independently to two or more different fluid sources is advantageous in terms of overall versatility, significant advantages can still be achieved if the apparatus 100 is modified so that all nozzles 160 are fluidly interconnected and are collectively connectable to any one of two or more fluid sources by the control system 182. In one embodiment, all the nozzles 160 are fluidly connected with a common inlet which is connectable with any one of two or more fluid sources by means of a valve arrangement operative under control of the control unit 183. This type of arrangement is simpler to implement but would still allow products to be extruded having at least two portions in which the capillaries are filled with different materials. The different fluids could include air and/or different liquid filling materials for example. It would also be possible to connect the nozzles 1 0 with a fluid source containing the same material used to form the body of the product so that in at least one portion, the product has no capillaries. Such an arrangement could be used to form solid end cap regions having no capillaries at either end of an extruded product. This would be useful where the liquid filling material remains liquid after the product has been extruded and is retained in the product by the solid end cap regions. An alternative arrangement for forming solid end cap regions is to temporarily stop the introduction liquid filling material through the nozzles and to increase the flow of the main comestible material through the die so that the capillaries are collapsed to produce a portion in the extrudate body having no capillaries. Further methods and apparatus for producing solid end caps are disclosed in the applicant's copending UK patent application No. GB 1003288, the contents of which are hereby incorporated by reference.

A further advantageous application of the apparatus 100 in accordance with the disclosure is to enable production to be switched between different products quickly and in some cases without stopping the extrusion process. Thus, a first product can be produced with the nozzles 160 connected, collectively or independently, to one or more fluid sources as appropriate for that product. Production can then be switched to a different product by using the control system 182 to connect the nozzles, collectively or independently, to one or more fluid sources as appropriate for the further product. In a simple example where all the nozzles are fluidly interconnected, a first product can be produced with the nozzles 160 connected to a source of a first liquid filling material having a first flavour and production switched to a second product by connecting the nozzles with a source of a second liquid filling material having a different flavour. Where the apparatus 100 is used to extrude chocolate bars for example, production could be switched between bars having an orange flavour filling to one having a mint flavour as one example. However, it will be appreciated that where the nozzles 160 are independently connectable with any one of two or more fluid sources, there are a large number of possible variations that could be adopted. It should also be appreciated that in any one of the production runs, the product may be extruded to have different fillings in different portions of the body in accordance with the methods and apparatus described above.

The ability to switch production quickly between two or more products allows the production of products in relatively small batch runs and so opens up the possibility of producing a broader range of products than might be commercially feasible using conventional apparatus.

Whilst in the preferred embodiment the nozzles 160 are shown as being connectable to any one of two alternative fluid sources 1S0A, 1S0B, it will be appreciated that the number of fluid sources to which the nozzles 160 can be connected need not be limited to two. Thus by modifying the apparatus appropriately, it can be arranged that the nozzles 160 can be connected, either independently or collectively or in groups, to any one of three, four or more fluid sources to increase the versatility of the apparatus. However, this will require a more complex control and fluid connection arrangement.

The electronic control 183 may comprise a CPU such as a computer. The CPU may be operative to run a suitable software programme for determining what fluid sources the nozzles 160 are required to be connected to produce a desired product and to provide an appropriate output or outputs to the valve block or to solenoid actuators associated with the valve block to effect the required connections. Alternatively, or in addition, the electronic control 183 may be operative in response to an input from an operator and/or from a further computer to connect the nozzles to a desired fluid source.

The CPU may be connected with a computer network which may be a private computer network such as an intranet or local area network (LAN) or it may be a wide area network (WAN) such as the internet. Connecting the control system 182 with a computer network enables the control system to be integrated as part of a broader production control system in a variety of ways. For example, where the apparatus 100 is used to enable production to be switched between various products, production runs for the various products can be automatically controlled in response to product orders via the computer network. The control system 182 may also be integrated with a control system for packaging of the products after extrusion to ensure the correct packaging is applied. Alternatively, or in addition, data from the apparatus 100 regarding the use of various materials in the extrusion process can be fed back via the computer network to enable re-ordering of materials as they are used up.

The increased versatility of the apparatus 100 in accordance with the disclosure and the ability readily switch production from one product to another opens up the possibility of producing customised products in response to customer orders.

Customisation may take many forms. For example, a customer may specify a particular image to be contained in the product. Thus a product having a particular name or logo running through it could be ordered, for example. The customer may be offered a range of images from which a selection can be made or the customer may be offered the facility to provide a graphic image which is assessed to determine if it can be reproduced to an acceptable quality in the product. Alternatively, or in addition, customisation may take the form of specifying particular flavours and/or flavour combinations, textures, and/or colours. The customer may specify the desired flavour and the software programme arranged to determine which fluids need to be introduced into the capillaries to achieve the requested flavour. Alternatively, the client may be able to select particular fluids to be introduced. Where the nozzles, are independently connectable to any one of a number of fluid sources, the customer may be able to specify particular fluid combinations and the ratio between the fluids. Thus the customer could order a product having a particular flavour or a combination of flavours which may be different in different portions of the product. For example, if the product were a chocolate bar, a customer could specify that orange and lemon flavoured fillings are used and could further specify the ratio of orange to lemon to meet their own personal preferences. A customer order could be for a single product or a minimum order in excess of one product may be required.

Figure 12:
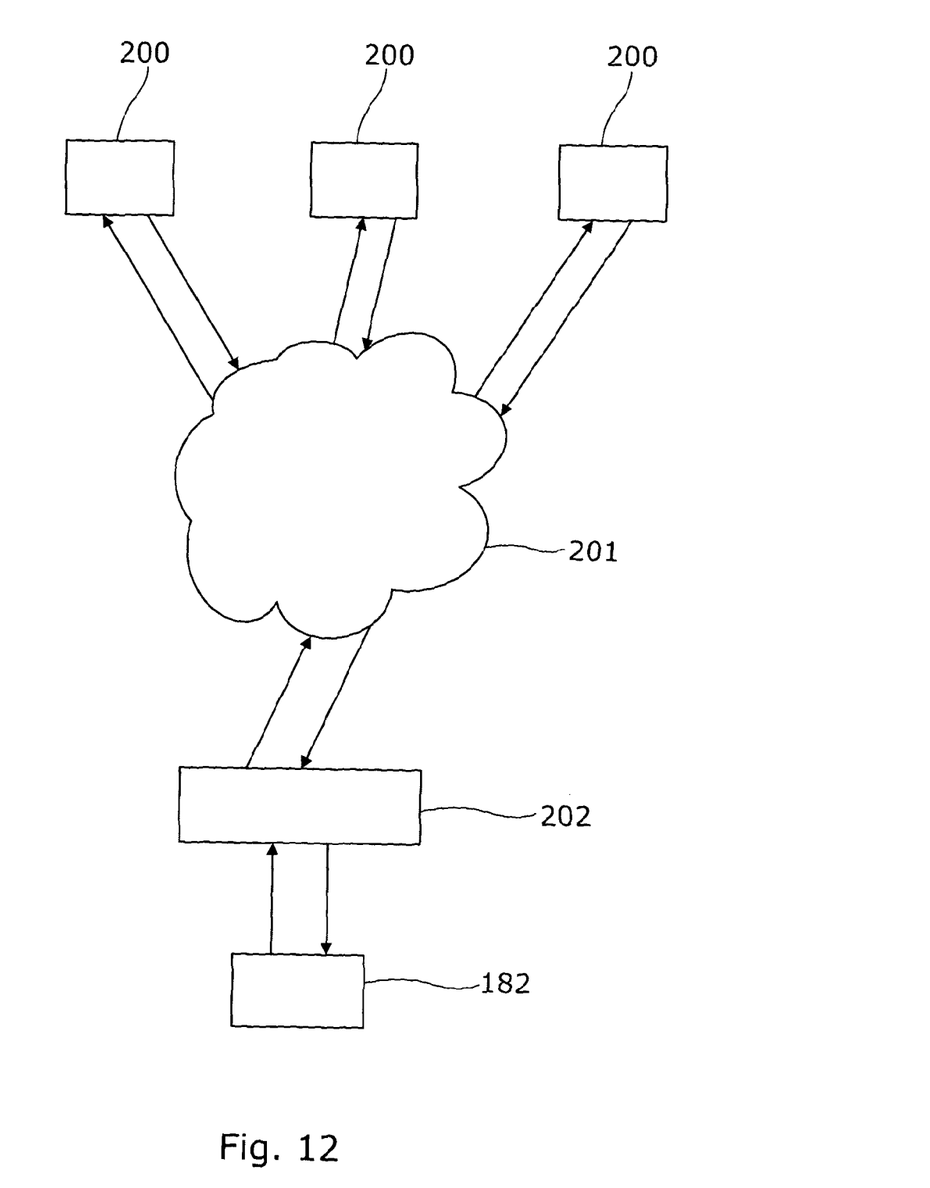
FIG. 12 is a schematic drawing illustrating how a control unit forming part of apparatus in accordance with the disclosure can be connected to a wide area network such as the internet.

Customer orders could be accepted in a number of different ways but it is especially preferred that customer orders are taken via computer using a computer network such as the internet. The ordering software can be programmed to collect the required data for processing and delivering the order and may include the facility to automatically assess graphic images to determine if they can be reproduced in a product. In one embodiment, the control system 182 is connected as part of the network so that once an order has been processed, the control system 182 is able automatically control the extrusion process to produce the customised product.

FIG. 12 illustrates schematically connection of the control system 182 of the apparatus 100 to customer computers 200 via the internet 201. Details of the hardware and software required to achieve a suitable connection are well known and so will not be described in detail. The control system 182 itself may not be connected directly with the internet but may be connected via a server or host computer 202. Using an internet connection, a customer can place an order for a customised product from their own computer. The order is processed and results in the control system 182 controlling the fluids supplied to the various nozzles 160 so as to produce the ordered product. The control system 182 may be part of a lager control system which controls other aspects of the extrusion process so that customisation could also include selection of the main comestible material used to form the body of the product as well as the fluid filling materials for the capillaries.

In most cases, it is expected that manufacture of customised products will be remote from the place of ordering and that products will be dispatched to the customer by post or courier. However, it is within the scope of the disclosure to set up local, small scale manufacturing facilities in retail areas to which a customer can gain access to place an order which can be taken away on the same day. In this case, the order may be taken by an operative who inputs the necessary instruction to the control system 182 or the customer may place an order via an in-store computer or kiosk which is networked with the control system 182, perhaps via a LAN.

Customisation is particularly enhanced where the nozzles 160 are each independently connectable to any one of two or more fluid sources. However, a more limited customisation can also be offered where the apparatus is modified so that the nozzles 160 are collectively connectable to different fluid sources. It is also within the scope of the disclosure to have a nozzle arrangement in which the nozzles are arranged in a number of groups, wherein the nozzles in each group are collectively connectable to different fluid sources under the control of a control system but where the fluid source for each group can be changed independently from the other group or groups.

Whereas the disclosure has particular application in the production of confectionery products, it can also be applied by suitable adaptation to the manufacture of other comestible products including savoury products. Tests carried out suggest that any material normally solid at room temperature (commonly regarded as around 20° C.) yet extrudable at elevated temperature and pressure can be formed into a body having capillaries using apparatus in accordance with the disclosure.

For use in the production of confectionery products, the main material used to produce the body portion may comprise any one or more of a number of materials commonly use in the production of confectionery—such as candy, gum and chocolate etc. In some embodiments, the body portion is chocolate. Suitable chocolate includes: dark, milk, white and compound chocolate. In some embodiments, the body portion is chewing gum, bubble gum or gum base. In other embodiments, the body portion is candy. Suitable candy includes hard candy, chewy candy, gummy candy, jelly candy, toffee, fudge, nougat and the like. The body may be formed from more than one comestible material, which materials may be mixed or extruded in separate portions.

For use in the production of savoury comestible products, the main material used to produce the body portion may comprise any one or more of a number of materials commonly use in the production of savoury products such as pasta, cereal, vegetable products and cheese.

It should also be noted that the term "liquid" is used in the description and claims in relation to the material for filling the capillaries to mean a material which is in a liquid or flowable state when introduced into the capillaries through the nozzles. Thus the term not only covers materials that remain in a liquid state in the capillaries at room temperature after extrusion but also materials that can be rendered liquid at elevated temperatures and/or pressure for the purposes of introducing it through the nozzles into the capillaries and which subsequently sets after extrusion. For example, a molten chocolate may be incorporated into the capillaries and allowed to set when cooled to room temperature. Alternatively, the capillaries may be filled with a material which is deposited as a liquid and which subsequently solidifies. In such embodiments, the solidification may be dependent or independent of heat. It will be apparent that solidification of a liquid filled capillary may be achieved in a number of ways. For example solidification may take place due to one or more of the following:

Cooling—the filling may be molten when deposited which then cools to a solid at room temperature;

Heating—the filling may be liquid when deposited, and the heat of the extruded body portion sets the filling (e.g. pumping egg albumen into a hot hard candy extruded body portion will set the egg on contact);

Drying—the filling may be a solution that dries into a solid (e.g. the moisture from the solution is absorbed into the extruded body portion);

Solvent loss—the filling may be in a solvent, whereby the solvent is absorbed into the extruded body portion, leaving a solid;

Chemical reaction—the filling may be deposited as a liquid but reacts or "goes off" into a solid;

Cross-linking—the filling may form a constituents for a cross-linked material due to mixing and/or heating; and Time—the filling may simply set with time (e.g. a solution of sugars and gelatin will eventually set over time).

Suitable liquid filling materials for the capillaries include, but are not limited to, aqueous media, fats, chocolate, caramel, cocoa butter, fondant, syrups, peanut butter, jam, jelly, gels, truffle, praline, chewy candy, hard candy, cheese, nuts, vegetable products or any combination or mixture thereof.

The foregoing embodiments are not intended to limit the scope of protection afforded by the claims, but rather to describe examples as to how the disclosure may be put into practice.

The invention claimed is:

1. An apparatus for producing a comestible product, the apparatus comprising a die head defining flow path leading to a die aperture for extruding a main comestible material to form an extruded body, a plurality of nozzles within the flow path for introducing a comestible fluid into the extruded body to form a plurality of filled capillaries in the extruded body, and a control system for selectively connecting each of the plurality of nozzles independently, wherein the control system is configured so as to be able to independently connect each of the plurality of nozzles to any one of at least two different sources of comestible fluid material, wherein each of the plurality of nozzles is associated with a dedicated nozzle valve that is controllable by the control system, and wherein each dedicated nozzle valve is controllable independently of any other nozzle valve to connect the respective nozzle to any one of the at least two different sources of comestible fluid material while the main comestible material is being extruded through the die aperture.

2. The apparatus as claimed in claim 1, wherein at least some of the nozzles are fluidly interconnected and the control system is operative to selectively connect each group of fluidly interconnected nozzles to any one of at least two fluid sources.

3. The apparatus as claimed in claim 1, in which each nozzle is independently fluidly connected with a valve for selectively connecting the nozzle with any one of at least two fluid sources, each valve being independently controlled by electronic control unit.

4. The apparatus as claimed in claim 1, wherein the nozzles are arranged in a matrix.

5. The apparatus as claimed claim 1, wherein each of the nozzles having an external width or diameter of 3 mm or less.

6. The apparatus as claimed in claim 1, wherein the control system comprises a CPU which is connected to a computer network which is a wide area network.

7. The apparatus as claimed in claim 1, wherein each of the plurality of nozzles include a diameter of 3 mm or less.

8. The apparatus as claimed in claim 1, wherein the plurality of nozzles include a number of up to 24 nozzles.

9. A process for manufacturing comestible products having an extruded body portion formed from a comestible material, the body having a plurality of filled capillaries disposed therein using the apparatus of claim 1, the process comprising: carrying out a first production run to produce a first product, extruding a main comestible product through the die head to produce an extrudate body during said first production run, the control system being operative to connect the plurality of nozzles to the at least two different sources as appropriate for the first product during said first production run; subsequently carrying out a second production run to produce a second product, extruding a second main comestible product through the die head to produce another extrudate body during said second production run, the control system being operative to connect the plurality of nozzles to the at least two different sources as appropriate for the second product, wherein between production runs, the at least two different sources are connectable to the same or different nozzles.

10. The process as claimed in claim 9, wherein production is switched from the first production run to the second production run without stopping extrusion of each of the main comestible product and the second main comestible product.

11. A process for manufacturing comestible products having an extruded body portion formed from a comestible material, the body having a plurality of capillaries filled with a fluid disposed therein using the apparatus as claimed in claim 1, the process comprising extruding a main comestible product through the die head to produce an extrudate body and using the control system to connect a first group of selected nozzles from said plurality of nozzles to at least one fluid source of said at least two different sources and the remaining nozzles of the plurality of nozzles to at least one other fluid source of said at least two different sources so that the fluid filled capillaries in the extrudate body define an image or pattern visible in lateral cross section of the extrudate body.

12. The process as claimed in claim 11, wherein the image or pattern defined by the filled capillaries is selected from the group consisting of: text, numbers, logos, pictures, and graphical representations.

13. The process as claimed in claim 11, wherein the process comprises changing the at least two different sources to which at least some of the plurality of nozzles are fluidly connected whilst the main comestible material is being extruded so that within each product length of extrudate, there are portions in which the fluid filled capillaries define different images or patterns.

14. A process for manufacturing comestible products having an extruded body portion formed from a comestible material, the body having a plurality of capillaries disposed therein using the apparatus as claimed in claim 1, the process comprising extruding a main comestible product through the die head to produce an extrudate body and using the control system to change at least one of the at least two different sources and flow of fluid to which at least one of the plurality of nozzles is connected whilst the main comestible product is being extruded so that within each product length of the extrudate body, at least one of the capillaries is filled with a different fluid at different positions along its length and/or formed at different positions at different portions along its length.

15. The process as claimed in claim 14, wherein at least some of the plurality of nozzles are fluidly interconnected and the control system is operative to selectively connect the fluidly interconnected nozzles collectively to any one of said at least two different sources, wherein the process comprises using the control system to change the fluid source of the at least two different sources to which the fluidly interconnected nozzles are connected whilst the main comestible product is being extruded so that each product length of the extrudate body has at least two portions in which the capillaries are filled with different fluid materials.

16. The process as claimed in claim 14, wherein each of the plurality of nozzles are independently connectable to any one of at least two fluid sources, wherein the process comprises introducing one fluid material through some of the plurality of nozzles and introducing at least one other fluid material through others of the plurality of nozzles simultaneously so that in at least one portion of each product length of the extrudate body, some of the capillaries are filed with said one fluid material and other of the capillaries are filled with said at least one other fluid material.

17. The process as claimed in claim 16, wherein the process comprises changing the ratio of said plurality of nozzles connected to said one fluid material and to said at least one other fluid material over the course of extruding each product length of the extrudate body.

* * * * *